(12) United States Patent
Zaitsev et al.

(10) Patent No.: US 10,185,825 B2
(45) Date of Patent: *Jan. 22, 2019

(54) SYSTEM AND METHOD FOR GENERATING RULES FOR DETECTING MODIFIED OR CORRUPTED EXTERNAL DEVICES

(71) Applicant: AO Kaspersky Lab, Moscow (RU)

(72) Inventors: Oleg V. Zaitsev, Moscow (RU); Olga E. Domke, Moscow (RU); Konstantin Y. Manurin, Moscow (RU); Mikhail A. Levinsky, Moscow (RU)

(73) Assignee: AP Kaspersky Lab, Moscow (RU)

( * ) Notice: Subject to any disclaimer, the term of this patent is extended or adjusted under 35 U.S.C. 154(b) by 191 days.

This patent is subject to a terminal disclaimer.

(21) Appl. No.: 15/165,422

(22) Filed: May 26, 2016

(65) Prior Publication Data

US 2017/0004304 A1 Jan. 5, 2017

Related U.S. Application Data

(63) Continuation of application No. 14/855,442, filed on Sep. 16, 2015, now Pat. No. 9,386,024.

(30) Foreign Application Priority Data

Jun. 30, 2015 (RU) ............................... 2015125967

(51) Int. Cl.
*H04L 29/06* (2006.01)
*G06F 21/56* (2013.01)
(Continued)

(52) U.S. Cl.
CPC ............ *G06F 21/56* (2013.01); *G06F 21/552* (2013.01); *G06F 21/85* (2013.01); *H04L 63/145* (2013.01); *G06F 2221/034* (2013.01)

(58) Field of Classification Search
CPC . H04L 63/20; H04L 63/1416; H04L 63/1425; H04L 63/1433; H04L 63/1441;
(Continued)

(56) References Cited

U.S. PATENT DOCUMENTS 6,971,028 B1 * 11/2005 Lyle ...................... G06F 21/554
709/224
7,080,250 B2 7/2006 Calvert
(Continued)

FOREIGN PATENT DOCUMENTS

| EP | 1971102 A1 | 9/2008 |
| JP | 2004-350313 A | 6/2017 |
| RU | 2163730 C1 | 2/2001 |

OTHER PUBLICATIONS

Nohl Karsten et al. "Bad USB-On accessories that turn evil" PacSec Applied Security Conference 2014. Nov. 12, 2014./XP-55242973.
(Continued)

*Primary Examiner* — Hosuk Song
(74) *Attorney, Agent, or Firm* — Arent Fox LLP

(57) ABSTRACT

Disclosed are systems and methods for generating rules for detecting modified or corrupted external devices connected to a computer system. An exemplary method includes analyzing data associated with the external device connected to the computer system based on stored data associated with one or more other devices; identifying at least one anomaly associated with the analyzed data that indicates the detected external device is modified or corrupted; generating at least one rule in response to the identified anomaly, wherein the at least one rule is based on the external device; and storing the at least one rule in a database accessible to the computer system.

20 Claims, 4 Drawing Sheets

(51) Int. Cl.
*G06F 21/55* (2013.01)
*G06F 21/85* (2013.01)

(58) Field of Classification Search
CPC ............... H04L 63/145; H04L 63/1458; H04L 63/1466; H04L 63/1475; H04L 63/1483
USPC .......................... 726/1, 22–26; 713/187–188
See application file for complete search history.

(56) References Cited

U.S. PATENT DOCUMENTS

| | | | |
|---|---|---|---|
| 7,257,737 B2 | 8/2007 | Dun et al. | |
| 7,359,962 B2* | 4/2008 | Willebeek-LeMair | ...................... H04L 29/06 709/223 |
| 7,370,359 B2* | 5/2008 | Hrabik | ................ H04L 63/1433 713/189 |
| 7,607,170 B2* | 10/2009 | Chesla | .................. G06F 21/552 709/224 |
| 8,006,302 B2* | 8/2011 | Abeni | ................ H04L 63/1408 726/22 |
| 8,141,163 B2 | 3/2012 | Pike | |
| 8,220,049 B2 | 7/2012 | Maynard | |
| 8,230,149 B1 | 7/2012 | Long et al. | |
| 8,281,058 B1 | 10/2012 | McCorkendale et al. | |
| 8,347,386 B2* | 1/2013 | Mahaffey | .............. G06F 21/564 726/23 |
| 8,566,946 B1* | 10/2013 | Aziz | .................... G06F 21/554 726/15 |
| 8,819,828 B1 | 8/2014 | Torrey et al. | |
| 9,386,024 B1* | 7/2016 | Zaitsev | ................. H04L 63/145 |
| 2006/0277275 A1 | 7/2006 | Glaenzer | |
| 2008/0282351 A1 | 11/2008 | Khilnani et al. | |
| 2010/0180350 A1 | 7/2010 | Glaubert | |
| 2011/0267964 A1 | 11/2011 | Baltatu et al. | |
| 2013/0204552 A1 | 8/2013 | Lin et al. | |
| 2013/0318610 A1 | 11/2013 | Zaitsev | |
| 2014/0137239 A1* | 5/2014 | Baluda | .................. G06F 21/552 726/22 |
| 2014/0137255 A1 | 5/2014 | Wang et al. | |
| 2014/0337558 A1 | 11/2014 | Powers et al. | |
| 2017/0193227 A1 | 7/2017 | Li et al. | |

OTHER PUBLICATIONS

Extended European Search Report dated Jan. 29, 2016.

* cited by examiner

SYSTEM AND METHOD FOR GENERATING RULES FOR DETECTING MODIFIED OR CORRUPTED EXTERNAL DEVICES

CROSS-REFERENCE TO RELATED APPLICATIONS

This application is a continuation of U.S. application Ser. No. 14/855,442, filed Sep. 16, 2015, which claims benefit of priority under 35 U.S.C. 119(a)-(d) to a Russian Application No. 2015125967 filed on Jun. 30, 2015, both of which are incorporated by reference herein.

FIELD OF TECHNOLOGY

The present disclosure relates generally to the field of computer security, and, more particularly, to a system and method for detecting modified or corrupted external devices.

BACKGROUND

Currently, the number of devices that can be connected to one another for transmission of data continues to grow significantly. Such devices include, for example, modems, personal computers, telephones and smartphones, video cameras, external hard disks and the like. When transmitting data between devices, wireline and wireless data transmission technologies are used. One of the most widespread methods of wireline connecting devices is a connection between the devices using a universal serial bus (USB).

However, as the number of devices having a USB connection continues to increase, a number of shortcomings and problems with these types of connections have been realized. Thus, a composite USB device when connected to a personal computer may be defined as one of several devices, such as, data storage, CD-ROM in which an installation disk is inserted, keyboard, and the like. This configuration is of interest to hackers. In particular, a hacker can exploit the composite configuration of a device and use a customized microprogram to integrate his own device, which may carry out malicious actions (e.g., a BadUSB attack class, see, e.g., https://ru.wikipedia.org/wiki/BadUSB).

Thus, a hacker can use a flash drive to trick a user's personal computer into defining a new device of a "keyboard" type, with which the loading and execution of malicious code can be performed, for example.

Currently, there are a number of solutions that exist whose purpose is to analyze the connected devices. However, these solutions perform an analysis of the connected devices and events, but make no mention of identification of anomalies caused by modified or corrupted external devices when such devices are connected to a computer system. Accordingly, the disclosed system and method makes it possible to effectively solve the problem of detecting anomalies when external devices are connected to a computer system.

SUMMARY

The disclosed system and method for detecting modified or corrupted external devices connected to a computer system. One exemplary method comprises analyzing data associated with the external device connected to the computer system based on stored data associated with one or more other devices; identifying at least one anomaly associated with the analyzed data that indicates the detected external device is modified or corrupted; generating at least one rule in response to the identified anomaly, wherein the at least one rule is based on the external device; and storing the at least one rule in a database accessible to the computer system.

In one exemplary aspect, the at least one rule is associated with at least one of a type of connection between the external device and the computer system, a connection port of the computer system to which the external device is connected, a type of the computer system, a type of the external device, a frequency of connection of the external device, an operating period of the external device, an operating period of the computer system, an electrical voltage associated with the external device, a resistance associated with the device, or a current associated with the device.

In one exemplary aspect, the identification of the at least one anomaly comprises detecting a malicious application delivered by the external device.

In one exemplary aspect, the analysis of the data includes determining at least one of whether the external device is unknown, how the external device was connected to the computer system, and a time of the connection between the external device and the computer system.

In one exemplary aspect, describing a condition of the computer system and at least one connected device that indicate the possible presence of modified or corrupted device.

In one exemplary aspect, the identification of the at least one anomaly associated with the analyzed data that indicates the detected external device is modified or corrupted comprises: applying one or more stored rules to the data associated with the external device to determine whether at least one condition of the rule is satisfied.

One exemplary system for analyzing a device connected to a computer system comprises a memory and at least one processor coupled to the memory and configured to: analyze data associated with the external device connected to the computer system based on stored data associated with one or more other devices; identify at least one anomaly associated with the analyzed data that indicates the detected external device is modified or corrupted; generate at least one rule in response to the identified anomaly, wherein the at least one rule is based on the external device; and store the at least one rule in a database accessible to the computer system.

One exemplary non-transitory, computer-readable medium storing computer-executable code for analyzing a device connected to a computer system, comprises instructions to: analyze data associated with the external device connected to the computer system based on stored data associated with one or more other devices; identify at least one anomaly associated with the analyzed data that indicates the detected external device is modified or corrupted; generate at least one rule in response to the identified anomaly, wherein the at least one rule is based on the external device; and store the at least one rule in a database accessible to the computer system.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
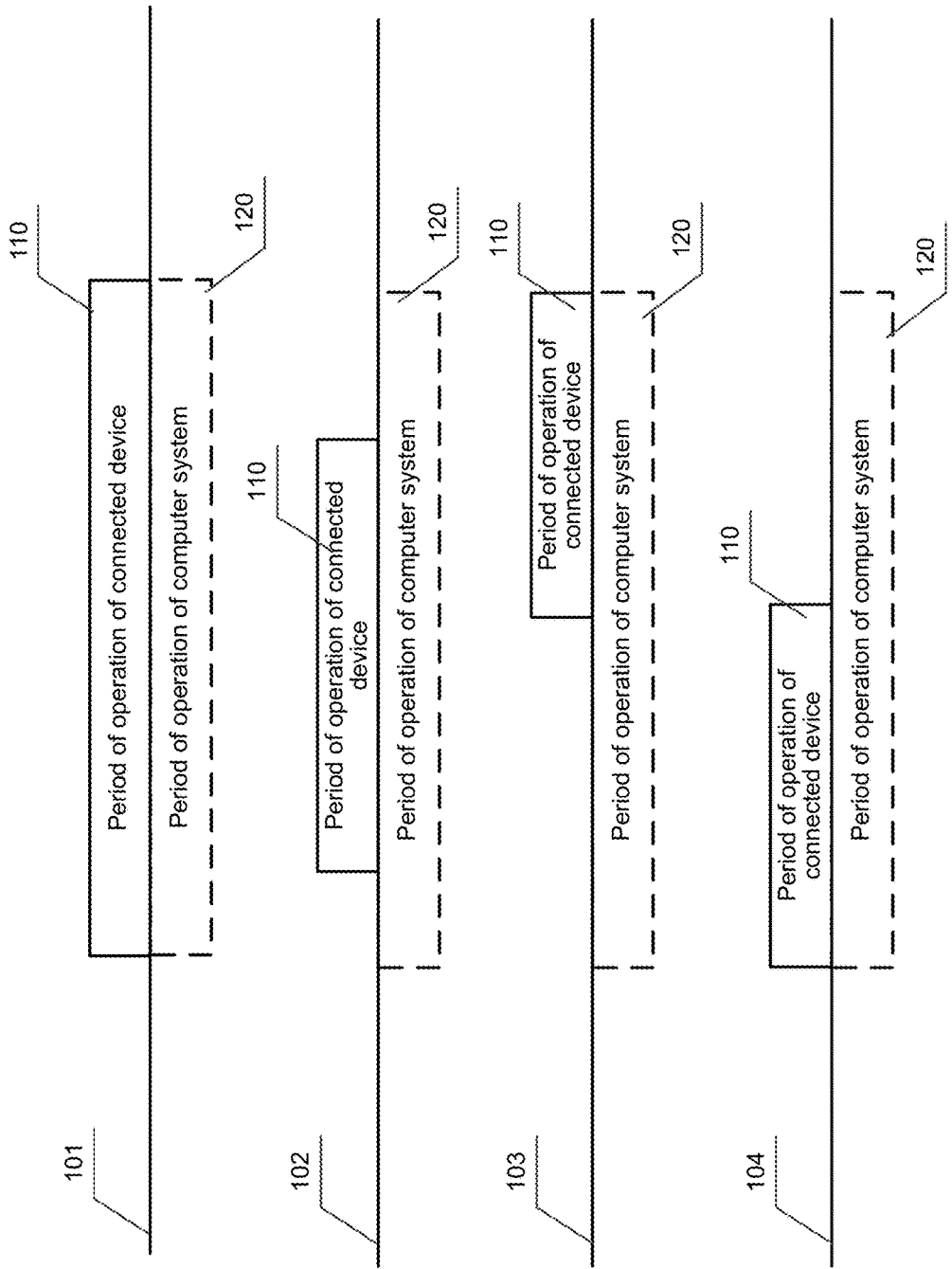
FIG. 1 illustrates four variations of an operational mode of a computer system and at least one connected device.

Example aspects are described herein in the context of a system, method and computer program product for detecting modified or corrupted external devices connected to a computer system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A device may include any electronic device that can be connected to a computer system including, but not limited to: data entry devices, such as keyboard, mouse and the like; data output devices, such as monitors, projectors, speakers, headphones and the like; data storage devices, such as external hard drives, external CD ROMS, USB memory sticks and the like; peripheral devices, such as printers, scanners, webcams, and the like; network communication devices, such as network cards, modems, routers, hubs and the like; as well as personal communication devices, such as mobile phones, tablets and the like.

A computer system may include, but not limited to: a personal computer (PC), a server, a notebook, a tablet, a smart phone, a network router, a gaming console, an industrial control system or other general-purpose or specialized computer equipment that has at least a processor and a memory and various other components of a general-purpose computer system illustrated in FIG. 4 below.

Devices may be connected to a computer system via wireline or wireless connections. An example of a wireline connection is a connection via a computer bus. In general, the bus connection is performed by connecting wires or contacts. One of the most frequently used wireline connections is a connection using a universal serial bus (USB). A wireless connection involves a connection without using wires or physical contacts on the basis of wireless radio or optical technologies. Some of the most frequently used wireless connections are Bluetooth and Wi-Fi. Example of a wireless network connection is the technology of a wireless personal area network (WPAN) or wireless local area network (WLAN).

A device modified by a hacker includes a device that, when connected, may be defined as being a standard device of a particular type, yet it has a code introduced by the hacker that is able to carry out harmful actions by the use of scripts, or has the ability to automatically execute a set of commands characteristic of the particular type of standard device, which cause the loading and running of a malicious software application.

The common operating mode of a computer system and at least one connected device is the ordinary routine condition of the computer system and at least one connected device, which is characterized by a sequence of turning the computer system on and off and the frequency of connecting and disconnecting at least one device in the course of a particular period of time, such as a work day.

In the course of setting up user computers, an administrator may often connect unknown devices to the computer system of the administrator, such as, a mouse, a keyboard, a monitor, hard disks, and the like. The administrator's computer system may be in the turned-on state for the course of several days, for example, if the administering is performed continuously. At the same time, the administrator's computer system may switch to the turned-off state several times an hour, for example, when replacing hard disks or video cards for the purpose of checking their operability.

In the computer system of a user, the frequency of changing devices is low, and the fact of connecting a new device has major importance. The computer system of a user is ordinarily in the turned-on state for the course of the full work day of the user. Moreover, the computer system of a user is seldom in the turned-off state in the course of the work day, even for a slight period of time, such as during rebooting or sleep mode.

When, for example, at least one port is being used in a computer system and at least one device is connected, and the period of time in which the computer system is in the turned-on state is determined, there can be four variations of the usual operating mode of the computer system and connected device.

FIG. 1 illustrates four variations of an operational mode of a computer system and at least one connected device. As shown, in the first variation 101, the period of operation of the computer system 120 and the period of operation of the connected device 110 are the same and match up. When the computer system is turned on, the device is connected, and accordingly when the computer system is turned off the device is disconnected. In this case, the device may be a constantly used keyboard or mouse, for example.

In the second variation 102, the operating period of the computer system 120 partly matches up with the operating period of the connected device 110. The match-up occurs only for a short period of time and there may be more than one match-up. In this variation, the device may be a constantly used flash drive, which the user periodically connects and disconnects, for example.

In the third variation 103, the operating period of the computer system 120 partly matches up with the operating period of the connected device 110 in the final segment of time. The match-up concludes with the computer system and the connected device turning off at the same time. In this case, the device may be an external hard disk, mobile telephone or flash drive, which was connected and left connected upon turn-off of the computer system, for example.

In the fourth variation 104, the operating period of the computer system 120 partly matches up with the operating period of the connected device 110 in the initial phase. The match-up concludes with the disconnection of the connected device long before the computer system is turned off. In this case, the device may be an external hard disk, mobile telephone or flash drive, which was connected in the period of time when the computer system was turned off, for example.

Based on the identified variations of the operating modes of the computer system and at least one connected device, one can determine anomalies in the device connection. Hereinafter, anomalies in the connection of the devices shall be understood to be a condition(s) of the computer system and at least one connected device that differs from the expected condition in the usual operating mode, which is a sign of the possible presence of a device modified/corrupted by a hacker. Thus, the system and method described herein is provided to identify anomalies in the connection of the devices to a computer system.

Figure 2:
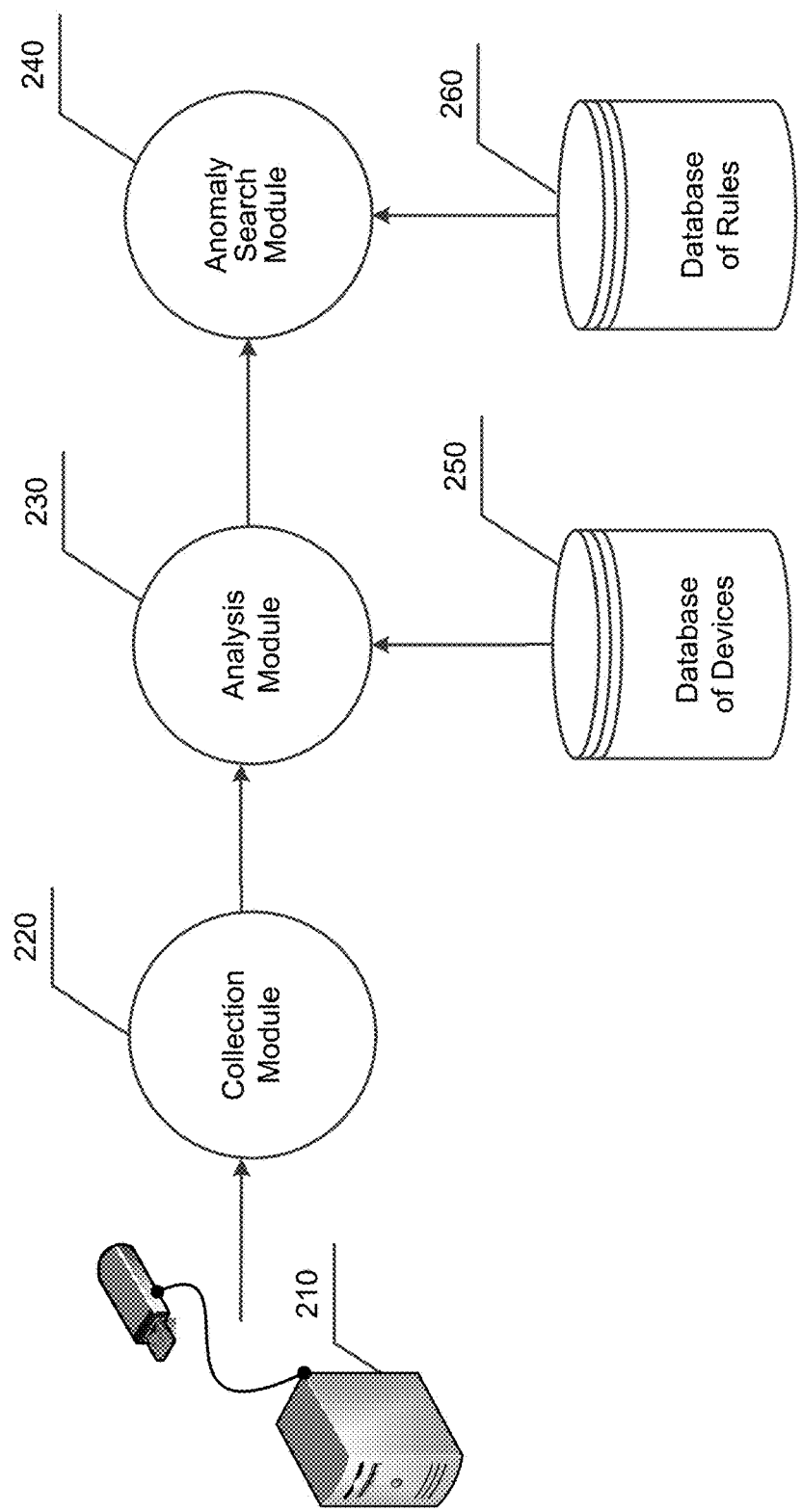
FIG. 2 illustrates a block diagram of the system of identifying anomalies when a device is connected to a computer system according to one exemplary aspect.

FIG. 2 illustrates a block diagram of the system of identifying anomalies when a device is connected to a computer system according to one exemplary aspect. As shown, the exemplary includes a computer system 210, to which at least one device is connected, a collection module 220, an analysis module 230, an anomaly search module 240, a database of devices 250, and a database of rules 260. An exemplary computer for implementing the exemplary system is described below with respect to FIG. 4. Moreover, it should be appreciated that although separate components are described according to the exemplary aspect, in other aspects one or more of these components can be combined as a single component. For example, device database 250 and rules database 260 could be combined as part of a single database according to another exemplary aspect.

According to the exemplary aspect, it is contemplated that a user can connect a device to the computer system 210 by a USB connection or other port of the computer system, for example. Moreover, the collection module 220 is configured to collect data from at least one connected device. The data collection can be done on a push basis (e.g., the device automatically transmits data to the collection module 220) or on a pull basis in response to a request from the collection module 220 to the connected device to send the data to the collection module 220.

In one exemplary aspect, the data on the connected device that is transmitted to the collection module 220 may contain the type of connection, the connection port, the type of computer system to which the device has been connected, the type of device, the frequency of connection of the device, the operating period of the device, the operating period of the computer system, and the like.

Figure 4:
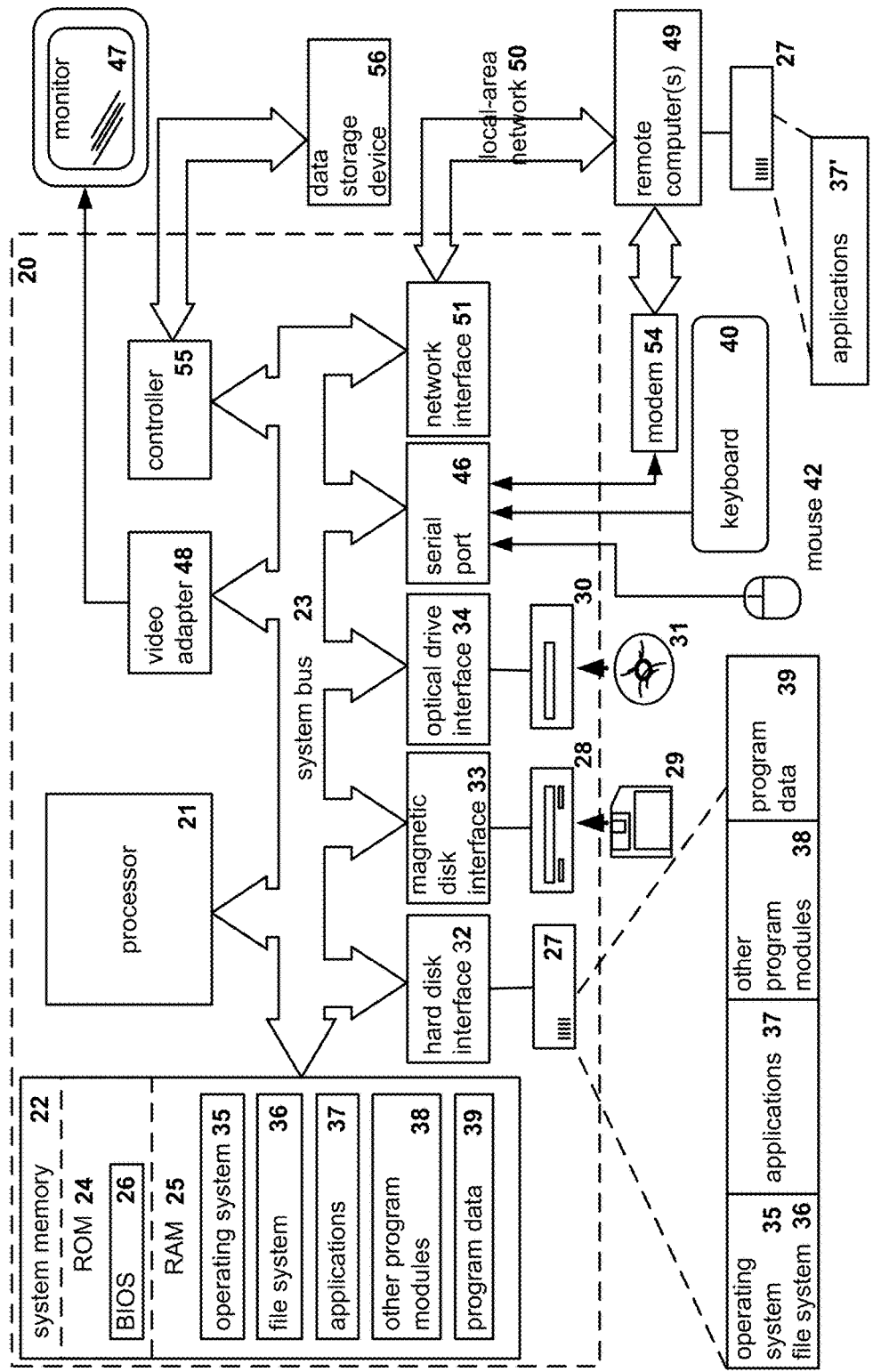
FIG. 4 presents an example of a general-purpose computer system on which the disclosed systems and method can be implemented according to an example aspect.

Once received, the collection modules 220 transmits the collected data to the analysis module 230, which can be a hardware processor as shown in FIG. 4, for example. The analysis module 230 is configured to analyze the collected data and the data on the devices previously connected to the computer system from the database of devices 250.

In the course of the analysis, the analysis module 230 can determine whether the connected device is unknown, how the device has been connected, register the time of the connection, and the like. The analysis module 230 is also configured to send the results of the analysis to the anomaly search module 240.

According to the exemplary aspect, the database of devices 250 is configured to store data relating to the devices that have been previously connected to the computer system. In alternative aspect, the database could also be loaded with data relating to additional devices that may in the future be connected to the computer system. In the exemplary aspect, the database can be filled and updated with the aid of the computer system, which collects data on the connected devices during the connecting process, or by a third-party antivirus server.

The data about the connected device is used when determining an anomaly when devices are connected, other than the variations indicated in FIG. 1, of the usual operating mode of a computer system and at least one connected device.

An example of an anomaly when devices are connected may be a disconnection of a connected device from a computer system that was operating according to the first variation of the usual operating mode 101. The disconnected device (e.g., a keyboard, mouse, video card, network card, and the like) in this case plays an important role in the user's working with the computer system and needs to be replaced at once. The device that will be connected to the same port and be of the identical type should be analyzed carefully, since it might be modified by a hacker, and the situation with disconnection of the connected device previously being used might be rigged.

The devices that are connected to a computer system may be classified by type, for example, input devices, output devices, information storage devices, and the like. The device types, in turn, may be subdivided into categories according to one exemplary aspect. Examples of categories of devices can be found at the following URL: https://msdn.microsoft.com/en-us/library/window/hardware/dn465876(v=vs.85).aspx, which is incorporated herein by reference.

Another example of an anomaly when devices are connected might be a condition when a device of identical type to the already existing one is connected to the computer system. For example, in the first variation of the usual operating mode 101, a device 1 is already connected to a port 1 of the computer system and has type 1 (keyboard). The computer system is also using port 2. A device 2 of type 1 (keyboard) connected to port 2 is an anomaly when devices are connected, since a situation is created when the customary user, already using the keyboard, connects a new keyboard, yet not in place of the old one, but in a different port. In this example, the device 2 should be further analyzed, since it might be modified by a hacker.

Yet another example of an anomaly when devices are connected might be a case when a device 1 replaces a device 2 at port 1 for a short period of time, not commensurable with the speed of changing the device by the user. The instantaneous switching of the device without disconnection is suspicious and not characteristic of human behavior, which may testify to the occurrence of a device modified by a hacker.

According to an exemplary aspect, the database of rules 260 is configured to store rules for determination of anomalies. A rule for determination of an anomaly is a set of conditions describing the condition of the computer system and at least one connected device that can indicate the possible presence of a device modified by a hacker.

Taking into account the above-given examples of anomalies when devices are connected, the following rule is formed: if a device 1 is constantly connected to a port 1 in a computer system, the disconnection of the device 1 and the connection of a device 2 to the port 1 is an anomaly when devices are connected and might be a sign of the presence of a device modified by a hacker. Other rules might be formulated on the basis of such conditions as the type of connection, the connection port, the type of computer system to which the device has been connected, the type of device, the frequency of connection of the device, the operating period of the device, the operating period of the computer system, the parameter of electrical voltage, resistance, current, and the like.

According to an exemplary aspect, the rule(s) may be automatically formulated by the anomaly search module 240 after an incident with the detection of a device modified by a hacker. For example, upon detecting a malicious application, it was discovered that it had been delivered to the computer system by means of a device which was defined as a printer. On the basis of data about the connecting of this device, a rule may be automatically formed for the determination of the anomaly and entered into the database of rules 260.

The rules for determination of anomalies can be changed in accordance with data about the type of computer system. For example, depending on the hardware the following types of computer systems are identified: stationary, portable, and server.

By default, no keyboard can be connected to a server computer system. Furthermore, two keyboards and two mice can be connected to a portable computer system, such as a notebook with docking station.

If the device has been connected by a wireline connection, the rules for determination of anomalies can be formulated on the basis of various physical parameter/conditions, such as the parameter of current strength. For example, a device of "keyboard" type consumes 70 mA when operating. In this case, the following rule will be formulated: if the connected device is defined as a keyboard, yet it consumes an amount of current different from that declared for this type of device, such a condition is considered to be an anomaly when devices are connected and a sign of the presence of a device modified by a hacker.

According to one aspect, neural nets and fuzzy logic may be employed in addition to the rules for determination of anomalies.

It should be appreciated to one skilled in the art that different kinds of databases can be used as the database of devices 250 and the database of rules 260. For example, the databases according to the exemplary can include, for example: hierarchical (IMS, TDMS, System 2000), network (Cerebrum, Cronospro, DBVist), relational (DB2, Informix, Microsoft SQL Server), object-oriented (Jasmine, Versant, POET), object-relational (Oracle Database, PostgreSQL, FirstSQL/J), functional, and the like. Updating of the databases can also be done by means of an antivirus server.

Figure 3:
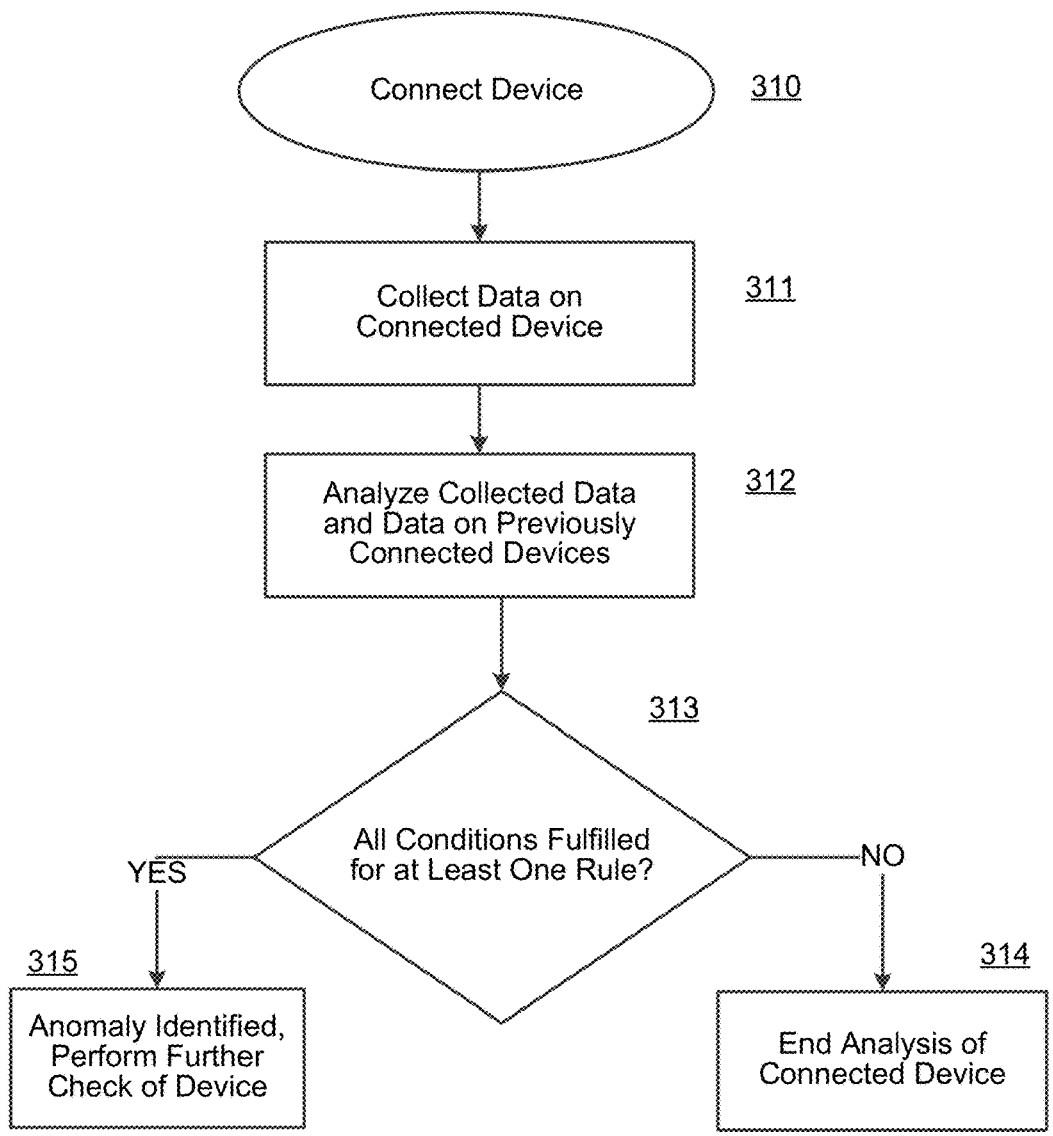
FIG. 3 illustrates a method of identifying anomalies when a device is connected to a computer system according to one exemplary aspect.

FIG. 3 illustrates a method of identifying anomalies when a device is connected to a computer system according to one exemplary aspect. As shown, in step 310, a device is connected to the computer system by a user, for example. In step 311, the collection module 220 performs a collection of data about the connected device and sends the collected data to the analysis module 230. In step 312, the analysis module 230 performs an analysis of the collected data and data about the devices previously connected from the database of devices 250. Next, the analysis module 230 transmits the results of the analysis to the anomaly search module 240. In step 313, the anomaly search module 240, on the basis of the results of the analysis and the rules for determination of anomalies from the database of rules 260, determines whether all conditions are met for at least one rule. If all conditions are fulfilled for at least one rule, in step 315 the anomaly search module 240 identifies an anomaly when devices are connected and commences a further checking of the connected device to discover whether the device has been modified/corrupted by a hacker. Alternatively, if the conditions from at least one rule are not fulfilled, then in step 314, the method for checking the device for anomalies ends.

According to an exemplary aspect, in the course of the further checking to identify a device modified/corrupted by a hacker, an antivirus check may be performed, such as one based on antivirus or behavioral signatures, a checking of the data being entered from the connected device, a checking for modification of the firmware of the device (if possible), and the like, as would be appreciated to one skilled in the art. If the device is determined to be modified or corrupted, the connection to the device may be terminated or blocked.

FIG. 4 illustrates an example of a general-purpose computer system (which may be a personal computer or a server) on which the disclosed systems and method can be implemented according to an example aspect. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for analyzing a first external device connected to a computer system, the method comprising:
   determining an operating mode of the computer system and a second device based on whether the period of operation of the computer system matches or partly matches a period of operation of the second device;
   analyzing data associated with the first external device connected to the computer system based on stored data associated with one or more other devices that includes the second device which were previously connected to or are currently connected to the computer system and further based on the determined operating mode of the computer system;
   identifying at least one anomaly associated with the analyzed data that indicates the detected first external device is modified or corrupted;
   generating at least one rule in response to the identified anomaly, wherein the at least one rule is based on the first external device; and
   storing the at least one rule in a database accessible to the computer system.

2. The method of claim 1, wherein the at least one rule is associated with at least one of a type of connection between the first external device and the computer system, a connection port of the computer system to which the first external device is connected, a type of the computer system, a type of the first external device, a frequency of connection of the first external device, an operating period of the first external device, an operating period of the computer system, an electrical voltage associated with the first external device, a resistance associated with the device, or a current associated with the device.

3. The method of claim 1, wherein the identification of the at least one anomaly comprises detecting a malicious application delivered by the first external device.

4. The method of claim 1, wherein the analysis of the data includes determining at least one of whether the first external device is unknown, how the first external device was connected to the computer system, and a time of the connection between the first external device and the computer system.

5. The method of claim 1, wherein the at least one rule includes a set of conditions describing a condition of the computer system and at least one connected device that indicate the possible presence of modified or corrupted device.

6. The method of claim 1, wherein the identification of the at least one anomaly associated with the analyzed data that indicates the detected first external device is modified or corrupted comprises:
  applying one or more stored rules to the data associated with the first external device to determine whether at least one condition of the rule is satisfied.

7. A system for analyzing a first external device connected to a computer system, the system comprising:
  a memory; and
  at least one processor coupled to the memory and configured to:
    determine an operating mode of the computer system and a second device based on whether the period of operation of the computer system matches or partly matches a period of operation of the second device;
    analyze data associated with the first external device connected to the computer system based on stored data associated with one or more other devices that includes the second device which were previously connected to or are currently connected to the computer system and further based on the determined operating mode of the computer system;
    identify at least one anomaly associated with the analyzed data that indicates the detected first external device is modified or corrupted;
    generate at least one rule in response to the identified anomaly, wherein the at least one rule is based on the first external device; and
    store the at least one rule in a database accessible to the computer system.

8. The system of claim 7, wherein the at least one rule is associated with at least one of a type of connection between the first external device and the computer system, a connection port of the computer system to which the first external device is connected, a type of the computer system, a type of the first external device, a frequency of connection of the first external device, an operating period of the first external device, an operating period of the computer system, an electrical voltage associated with the first external device, a resistance associated with the device, or a current associated with the device.

9. The system of claim 7, wherein the identification of the at least one anomaly comprises detecting a malicious application delivered by the first external device.

10. The system of claim 7, wherein the analysis of the data includes determining at least one of whether the first external device is unknown, how the first external device was connected to the computer system, and a time of the connection between the first external device and the computer system.

11. The system of claim 7, wherein the at least one rule includes a set of conditions describing a condition of the computer system and at least one connected device that indicate the possible presence of modified or corrupted device.

12. The system of claim 7, wherein the identification of the at least one anomaly associated with the analyzed data that indicates the detected first external device is modified or corrupted comprises:
  application of one or more stored rules to the data associated with the first external device to determine whether at least one condition of the rule is satisfied.

13. The system of claim 7, wherein the at least one processor configured to determine the operating mode of the computer system and the second device based on whether the period of operation of the computer system matches or partly matches a period of operation of the second device is further configured to:
  identify a first operating mode of the computer system and the second device based on a determination that the period of operation of the computer system matches the period of operation of the second device;
  identify a second operating mode of the computer system and the second device based on a determination that the period of operation of the computer system partly matches the period of operation of the second device;
  identify a third operating mode of the computer system and the second device based on a determination that the period of operation of the second device partly matches a final segment of time of the period of operation of the computer system; and
  identify a fourth operating mode of the computer system and the second device based on a determination that the period of operation of the second device partly matches an initial segment of time of the period of operation of the computer system.

14. A non-transitory, computer-readable medium storing computer-executable code for analyzing a first external device connected to a computer system, comprising instructions to:
  determine an operating mode of the computer system and a second device based on whether the period of operation of the computer system matches or partly matches a period of operation of the second device;
  analyze data associated with the first external device connected to the computer system based on stored data associated with one or more other devices that includes the second device which were previously connected to or are currently connected to the computer system;
  identify at least one anomaly associated with the analyzed data that indicates the detected first external device is modified or corrupted;
  generate at least one rule in response to the identified anomaly, wherein the at least one rule is based on the first external device; and
  store the at least one rule in a database accessible to the computer system.

15. The computer-readable medium of claim 14, wherein the at least one rule is associated with at least one of a type of connection between the first external device and the computer system, a connection port of the computer system to which the first external device is connected, a type of the computer system, a type of the first external device, a frequency of connection of the first external device, an operating period of the first external device, an operating period of the computer system, an electrical voltage associated with the first external device, a resistance associated with the device, or a current associated with the device.

16. The computer-readable medium of claim 14, wherein the identification of the at least one anomaly comprises detecting a malicious application delivered by the first external device.

17. The computer-readable medium of claim 14, wherein the analysis of the data includes determining at least one of whether the first external device is unknown, how the first external device was connected to the computer system, and a time of the connection between the first external device and the computer system.

18. The computer-readable medium of claim 14, wherein the at least one rule includes a set of conditions describing a condition of the computer system and at least one connected device that indicate the possible presence of modified or corrupted device.

19. The computer-readable medium of claim 14, wherein the identification of the at least one anomaly associated with the analyzed data that indicates the detected first external device is modified or corrupted comprises:
application of one or more stored rules to the data associated with the first external device to determine whether at least one condition of the rule is satisfied.

20. The method of claim 1, wherein determining the operating mode of the computer system and the second device based on whether the period of operation of the computer system matches or partly matches a period of operation of the second device further comprises:
identifying a first operating mode of the computer system and the second device based on a determination that the period of operation of the computer system matches the period of operation of the second device;
identifying a second operating mode of the computer system and the second device based on a determination that the period of operation of the computer system partly matches the period of operation of the second device;
identifying a third operating mode of the computer system and the second device based on a determination that the period of operation of the second device partly matches a final segment of time of the period of operation of the computer system; and
identifying a fourth operating mode of the computer system and the second device based on a determination that the period of operation of the second device partly matches an initial segment of time of the period of operation of the computer system.

* * * * *